United States Patent [19]

Blair

[11] 4,031,965

[45] June 28, 1977

[54] TILLAGE TOOL WING FOLDING KIT

[76] Inventor: Calvin B. Blair, P.O. Box 97, Barnard, Kans. 67418

[22] Filed: Dec. 17, 1975

[21] Appl. No.: 641,628

[52] U.S. Cl. .................... 172/311; 172/414; 172/417; 172/501; 172/456; 56/15.8

[51] Int. Cl.² .......................... A01B 63/00

[58] Field of Search .......... 172/311, 501, 502, 414, 172/417, 449, 456, 458; 56/15.8

[56] References Cited

UNITED STATES PATENTS

| 3,797,580 | 3/1974 | Roth | 172/311 |
|---|---|---|---|
| 3,810,660 | 5/1974 | Peterson | 172/311 |
| 3,866,688 | 2/1975 | Hansen | 172/311 |

Primary Examiner—George J. Marlo
Attorney, Agent, or Firm—Fishburn, Gold & Litman

[57] ABSTRACT

A wing folding or lift kit adapted to be easily installed on the central frame members of foldable, multi-sectioned earthworking implements to selectively move pivotally mounted side sections or wings. A centrally mounted floating hydraulic cylinder has linkage arms hinged on the ends thereof, with the outer ends of said arms attached, by lost-motion links, to cross members of the wings. In cylinder-extended position, the wings are free to follow ground contour without "working" the cylinder. Upon contraction of the cylinder, the wings are rotated or folded.

10 Claims, 9 Drawing Figures

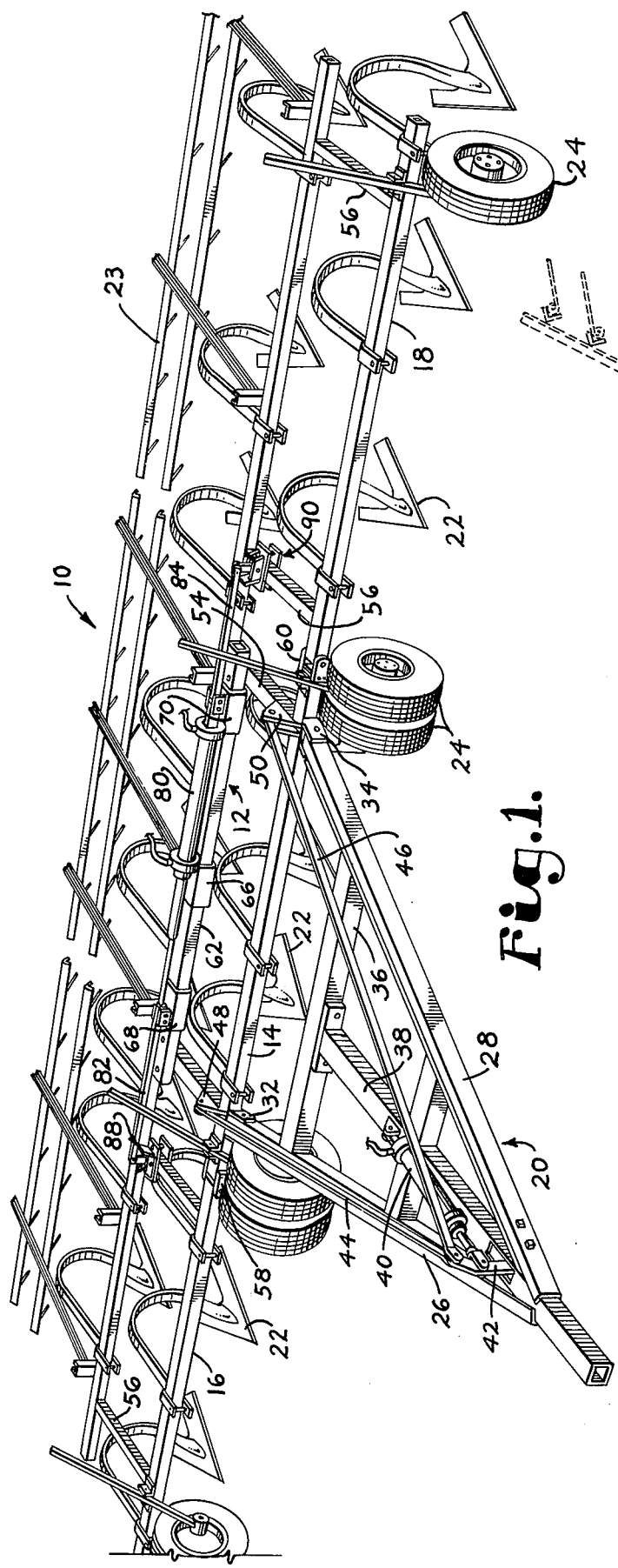
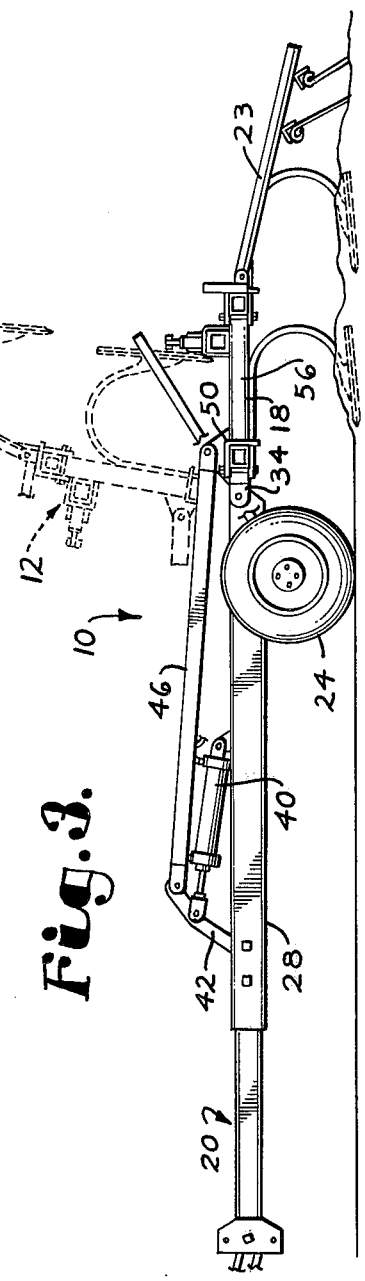
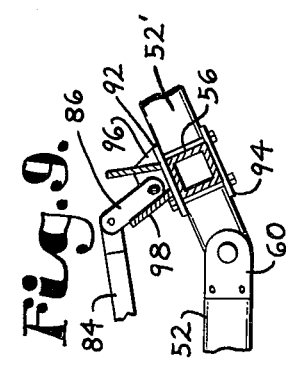

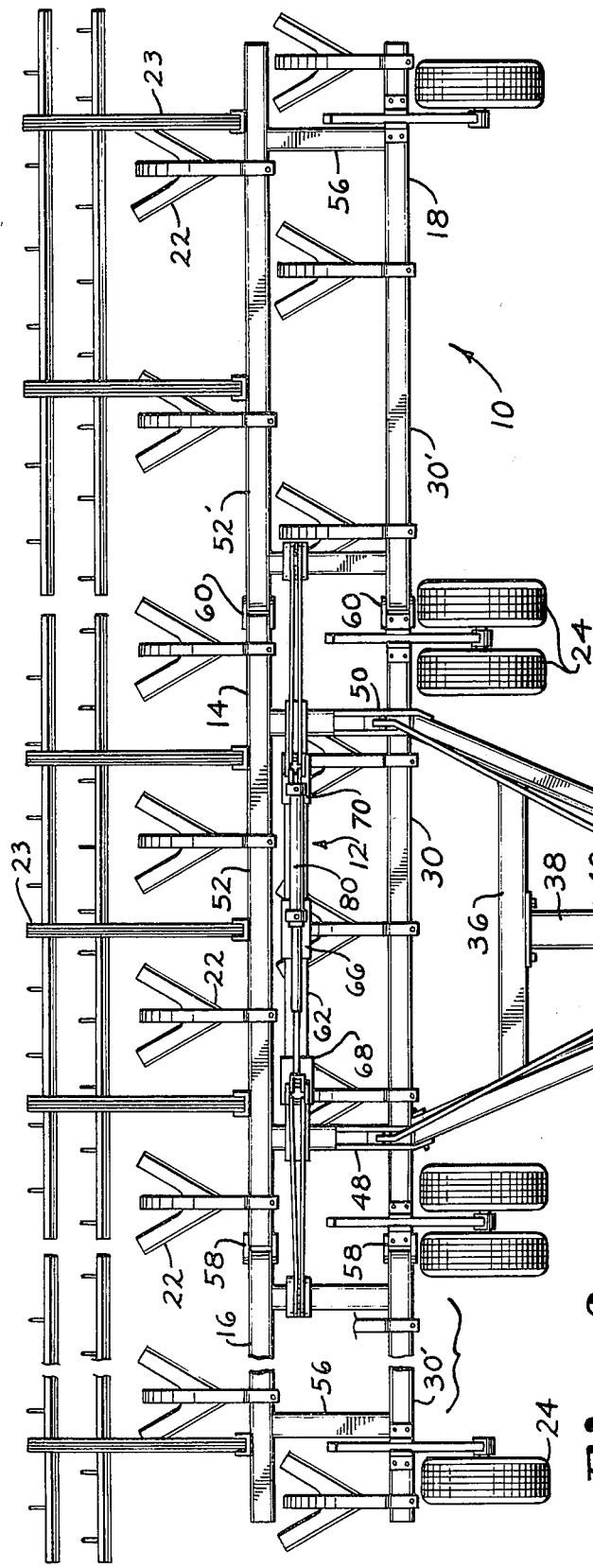
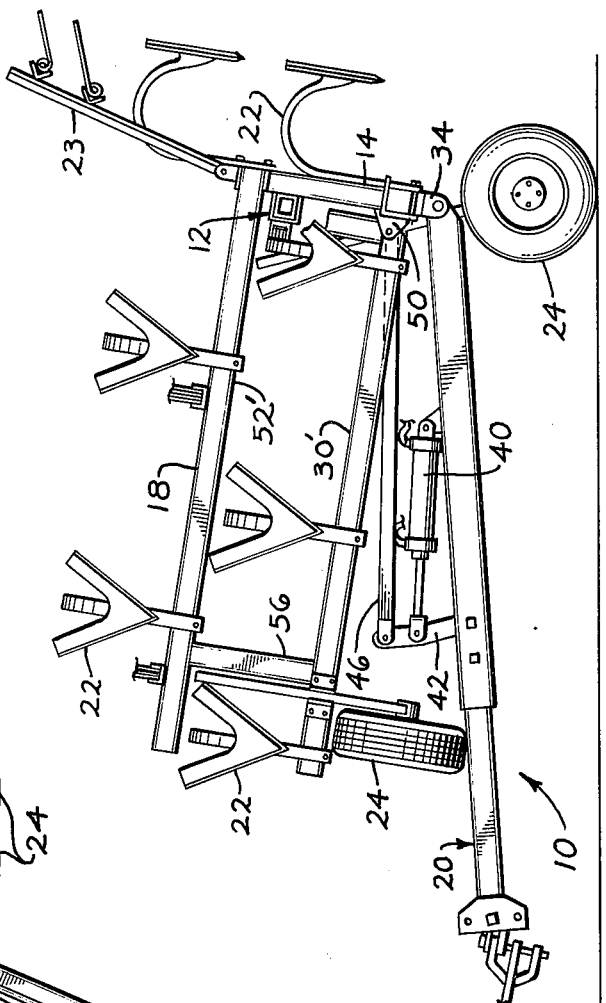
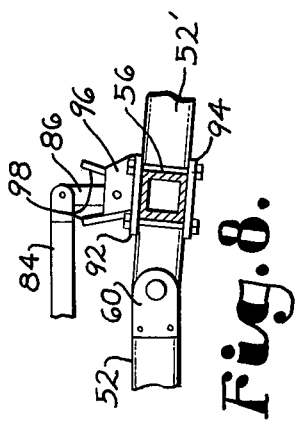

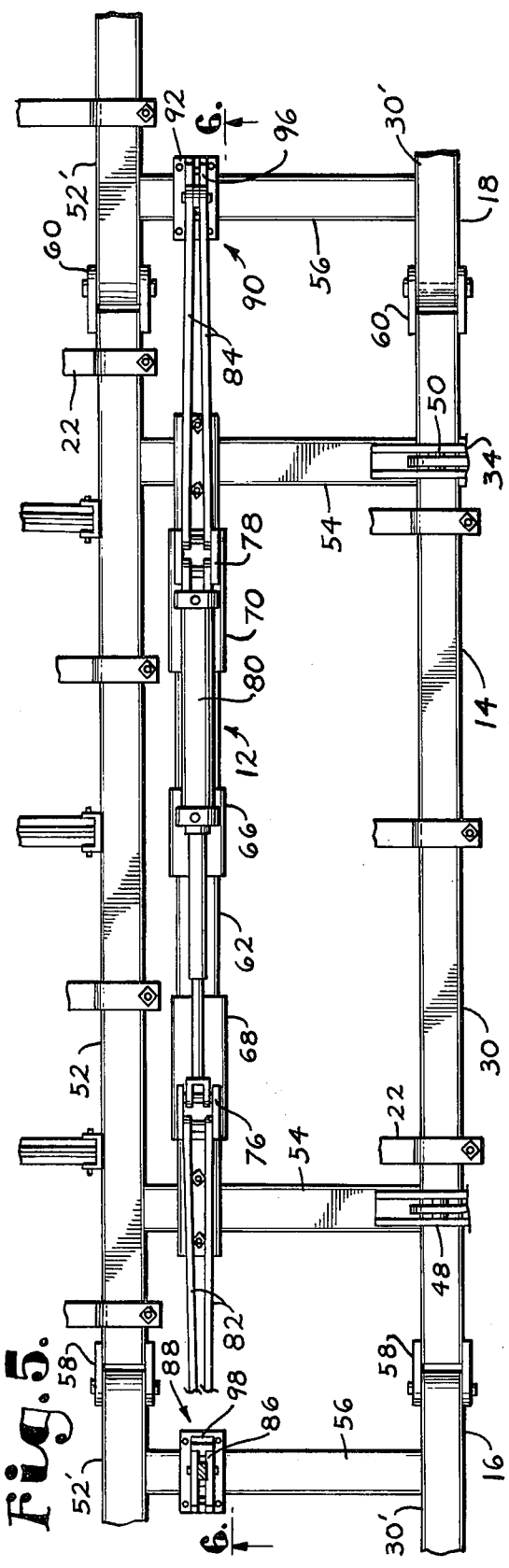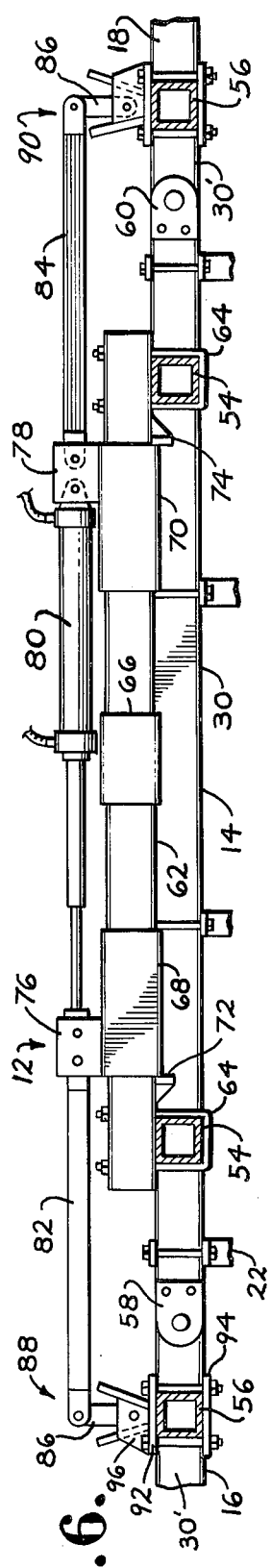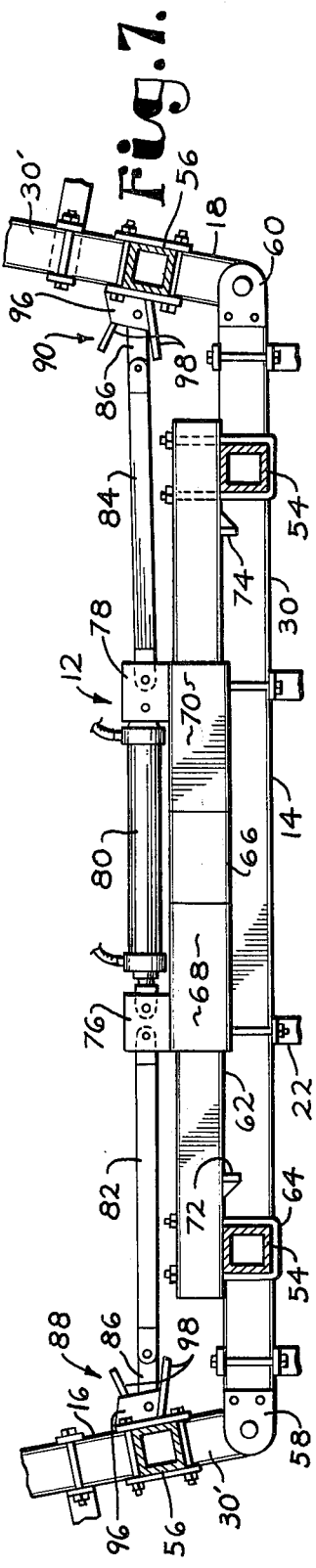

TILLAGE TOOL WING FOLDING KIT

The increased availability of high power tractors has permitted various types of agriculture implements, such as field cultivators, to be extended in operating widths, for example 60 feet. While this is desirable for efficient field use, these widths necessitate folding for transportation and storage. Common construction of such implements includes a tow bar section, a center carriage, and wing sections mounted by hinges on each side of the carriage. When it is desired to transport the implement, the center carriage and the connected wings, are commonly rotated as a unit forwardly and upwardly about an axis transverse to the tow bar section by an hydraulic ram and linkage arms. The hinges of the wings then assume a generally vertical axis about which the wings are rotated or folded, usually forwardly, to reduce the width of the implement. Known mechanical devices for so folding the wings are generally complicated combinations of linkage arms, cables, chains and the like which are usually factory installed.

In contrast to prior art devices, the present invention provides for an improved and more efficient lift or folding mechanism kit adapted to be fitted to both new and various existing earth working implements. The lift mechanism includes a centrally mounted, rigid, elongated, transverse bar or tube having a central stop member attached thereto. A pair of mounts are slidable on the tube and an hydraulic cylinder in normally extended condition is secured therebetween. Outwardly extending arms are pivotally attached to opposite ends of the cylinder and to upwardly projecting cam arms which are pivotally received in lost-motion connectors attached to cross members of the wing structure. Upon contraction of the cylinder, the slidable mounts telescope inwardly with the outwardly extending arms causing the wing structure to rotate or fold about the center carriage. The lost-motion connectors permit the wings to move during field operations without "working" the cylinder or adjacent linkage.

Accordingly, it is an object of the present invention to provide simplified structure for folding the wings of a multi-section earth working implement; to provide such a device which is easily attached to new or a variety of existing multisectioned implements; to provide such a device which allows normal field operations without working the cylinder or adjacent linkage; and to provide a wing folding kit which is relatively inexpensive to build and install but yet very well adapted for its intended purpose.

Various other objects and advantages will become apparent upon reference to the description of the drawings, specification, and the appended claims.

FIG. 1 is a perspective view of a wing lift kit embodying this invention shown attached to a multi-sectioned implement assuming an operational field position.

FIG. 2 is a plan view of the kit as shown in FIG. 1.

FIG. 3 is a side elevational view of the kit and implement as shown in FIG. 1 with a wing lifted, but unfolded, position shown in broken lines.

FIG. 4 is a side elevational view of the implement in wing forward folded position.

FIG. 5 is an enlarged fragmentary plan view of the wing lift kit in wing unfolded position.

FIG. 6 is a fragmentary front elevation taken along lines 6—6, FIG. 5.

FIG. 7 is a fragmentary elevation similar to FIG. 6, but showing the side wings folded.

FIG. 8 is a fragmentary front elevation of a lost-motion connector associated with the kit, shown in field operating position.

FIG. 9 is a fragmentary elevational view similar to FIG. 8 but illustrating the lost-motion connector in partial folded position.

Referring to the drawings im more detail, the reference numeral 10 generally designates a foldable agricultural implement or soil conditioner having mounted thereon a wing lift kit or device 12 embodying the invention. The kit 12 is shown mounted on a centrally located carriage section 14 and extending to a pair of wing sections 16 and 18 hingedly connected on opposite sides of the carriage section. A draw bar 20 is vertically pivotally connected to the carriage section 14. A series of ground engaging tools, in this example, V-blade plows 22 and harrow bars 23, are mounted on frame members of the carriage section 14 and wing sections 16 and 18, the penetration of the plows 22 into the soil being controlled by adjustable supporting wheels 24.

The draw bar 20 is connected to a suitable tractor (not shown) by conventional means and includes a pair of forwardly converging hitch frame members 26 and 28 which are pivotally connected to the forward frame member 30 of the carriage section 14 by hinges 32 and 34. The draw bar section 20 also includes a transverse frame member 36, which is, in turn, secured to a longitudinal frame member 38, this forming a rigid draw structure.

Pivotally mounted at one end on the frame member 38 is an hydraulic ram 40, with the other end pivotally connected to an upstanding lever 42. The lever 42 is pivotally mounted to the frame member 38 at its lower end, and has its upper end extending beyond the ram 40 connection where it is pivotally connected to a pair of rearwardly diverging, generally horizontal rods 44 and 46. The rods 44 and 46 are received by a pair of upstanding, rigid brackets 48 and 50, mounted on the forward frame member 30 of the central carriage section 14.

The carriage section 14 is constructed of elongated, spaced-apart transverse frame members 30 and 52 and spaced-apart longitudinal cross braces 54, thus forming a rigid framework for suitably carrying a variety of earthworking tools.

The wings 16 and 18 constitute lateral extensions of the carriage section 14 and are formed of tool carrying pairs of spaced-apart transverse frame members, with forward members 30' being in alignment with carriage frame member 30 and rearward members 52' in alignment with frame member 52. Inner and outer longitudinal cross braces 56 complete a rigid framework for the wing members. The wings 16 and 18 are pivotally connected to the carriage frame members 30 and 52 by suitable hinges 58 and 60 located at respective junctions. The hinges 58 and 60 allow the wings to move or pivot about the carriage section 14, permitting both folding for transport and move even ground contact during field operation.

The wing lifting linkage kit 12 is here shown centrally mounted generally on and between the cross members 54 of the central carriage 14, and is comprised of an elongated tubular main frame member 62 secured at opposite ends thereof to the cross members 54 by suitable U-bolts 64. An integral central stop portion 66 is rigidly mounted centrally on the main frame member 62. A pair of opposed mounts 68 and 70 fit in a sliding or telescoping relationship over the main frame member 62 on opposite sides of the central stop 66. Additional stop members 72 and 74 are secured, in this example, to the lower surface of the main frame member 62, adjacent the ends thereof and limit the outer movement of the mounts 68 and 70, the central stop 66 limiting inward movement.

Each of the slidable mounts 68 and 70 include a pair of upstanding ears 76 and 78 receiving opposite ends of an hydraulic ram or cylinder 80, whereby the cylinder "floats" with respect to the main frame member 62. Pairs of elongated, outwardly extending horizontal arms 82 and 84 are received in a pivotal arrangement by the ears 76 and 78, with the outer ends connected to upstanding vertical links or cam arms 86. Each of the cam arms 86 is pivotally mounted within a lost-motion wing connector assembly 88, 90 which is secured to the respective interior wing cross members 56.

The connector assemblies 88, 90, in this example, are each formed of a pair of upper and lower plates 92 and 94 held in a clamping arrangement around said cross members by suitable bolts. The upper plates have secured thereto a pair of parallel support walls 96 and a pair of upwardly diverging load bearing walls 98. The load bearing walls 98 are spaced-apart at their lower ends, permitting the cam arm 86 to be pivotally mounted therebetween for arcuate movement limited by contact therewith.

In field operation, the draw bar section 20, central carriage section 14, and the wings 16 and 18 all lie in a generally horizontal plane. When the apparatus operator desires to move the implement a relatively short distance, as from one field to another across a road, the hydraulic ram 40 is extended, moving the lever 42 and the rods 44 and 46 forwardly, thus mechanically pivoting the carriage and wing sections upwardly and forwardly to generally a vertical position as shown in FIG. 3. Upon arriving at the desired location, the ram 40 is relaxed, pivoting the sections about the hinges 32 and 34 and allowing the plow tools and harrow bars to again engage the surface. However when the implement must pass through a gate or other narrow openings, the wing lifting linkage kit 12 is activated, either with or without first vertically positioning the structure about the hinges 32 and 34, contracting cylinder 80 and causing the horizontal arms 82 and 84 to rotate the cam arm 86 against the interior load bearing walls 98, (as illustrated in FIG. 9). The height of the load bearing walls 98 combined with the contracting force of the cylinder cause rotation of the wing sections about the hinges 58 and 60 to a folded position (such as shown in FIG. 7) which is limited by contact between the mounts 68 and 70 and the central stop 66. This decreases the width of the soil conditioner to allow passage through relatively narrow openings.

When the cylinder 80 and its mounts contract, they may not do so in a uniform manner. For example, the earth working tools of one wing section may be more firmly engaged in the earth than the other. In such a case, one wing may fold first until no further movement is permitted due to the stop 66, and greater force will then automatically be applied to the other wing. When it is desired to redeploy the wing sections 16 and 18, the cylinder 80 is extended, moving the cam arms, if necessary, into engagement with the outer pair of load bearing walls of the wing connectors 88 and 90. However, under most circumstances gravity alone will cause redeployment of the wings to field position, the cylinder 80 then acting as a brake to supply control against rapid movement and resultant shock loading.

As noted briefly above, the diverging load bearing walls 98 of the respective wing connectors 88 and 90 allow some arcuate movement of the connectors without engaging the cam arms 86. This permits flexure of the wing sections during field operation for more even tillage over rolling terrain. The stops 72 and 74 position the cam arms 86 generally centrally between the walls 98 when the implement is on a plane surface to allow generally equal flexure in both directions. In this regard, it is noted that no amount of flexing or folding of wings will place lateral or transverse loads on the cylinder 80, the cylinder, in this example, always remaining generally parallel to the frame member 62 and floating between the aligned mounts 68 and 70. The stops 72 and 74 also function with the walls 98 and associated linkage to limit "over center" folding of the wings which is otherwise likely to cause damage to the implement when traveling in a folded condition.

It is to be understood that the above described wing lifting kit is usually easily attached to and removed from earth working implements while constituting a relatively simple, inexpensive arrangement utilizing only one cylinder.

From the forgoing description, it should be apparent that various changes may be made in the form, location and relative arrangement of the several parts without departing from the essential characteristics of the invention and it is to be further understood that this invention is not to be limited except insofar as such limitations are included in the following claims.

I claim:

1. A wing lifting arrangement having structural characteristics adapting same for use in combination with an earthworking implement having a central carriage with a rigid frame portion and lateral wings hingedly connected to said central carriage, said arrangement comprising:
    a. an elongated main frame member adapted for mounting on said frame portion transversely of said carriage;
    b. a pair of cylinder mounts slideable along said frame member;
    c. an extensible cylinder connected to said mounts and extending therebetween and operable to urge said mounts toward and away from each other;
    d. a pair of arms respectively pivotally connected at a first end thereof to said cylinder mounts and extending in generally opposite directions away from said cylinder; and
    e. a wing connector adapted for mounting on each of said wings, said arms respectively being pivotally connected at a second end thereof to said wing connectors, whereby the contraction of said cylinder produces relative movement of said cylinder mounts toward each other and folding of the wings about said central carriage.

2. The arrangement as set forth in claim 1 including:
    a. spaced-apart clamping means on said main frame member and facilitating mounting on said central carriage, and wherein
    b. said cylinder mounts are positioned between said clamping means.

3. The arrangement as set forth in claim 1 including:
    a. spaced-apart stops mounted on said main frame member and outwardly of said cylinder mounts and limiting the outward movement of said cylinder mounts.

4. The arrangement as set forth in claim 1 including:
stop means mounted on said main frame member and between said cylinder mounts and positioning said cylinder mounts on said frame member upon contraction of said cylinder.

5. The arrangement as set forth in claim 1 including:
a. a lost-motion link operably connected with said cylinder and adapted for connection with said wings and permitting limited wing movement with respect to said central carriage without working said cylinder.

6. The arrangement as set forth in claim 5 wherein:
a. said lost-motion link is associated respectively with said wing connectors.

7. The arrangement as set forth in claim 1 including clamping means on said wing connectors and facilitating mounting said wing connectors on said wings.

8. In combination, a wing lifting arrangement and an earthworking implement having a central carriage with a rigid frame portion and lateral wings hingedly connected to said central carriage, said combination comprising:
a. an elongated main frame member mounted on said frame portion transversely of said carriage;
b. a pair of cylinder mounts slideably connected with said frame member;
c. an extensible cylinder connected to said mounts and extending therebetween and operable to urge said mounts toward and away from each other;
d. a pair of arms respectively pivotally connected at a first end thereof to said cylinder mounts and extending in generally opposite directions away from said cylinder; and
e. a wing connector mounted on each of said wings; said arms respectively being pivotally connected at a second end thereof to said wing connectors, whereby the contraction of said cylinder produces relative movement of said cylinder mounts toward each other and folding of the wings about said central carriage.

9. The combination as set forth in claim 8 wherein:
a. a stop is fixed on said main frame member between said cylinder mounts and limits the movement of said cylinder mounts toward each other.

10. The combination as set forth in claim 8 wherein:
a. spaced-apart stops are mounted on said main frame member and outwardly of said cylinder mounts and limiting the outward movement of said cylinder mounts.

* * * * *